| United States Patent [19] | [11] Patent Number: 4,946,243 |
| Suzuki et al. | [45] Date of Patent: Aug. 7, 1990 |

[54] OPTICAL MODULATION ELEMENT

[75] Inventors: Masatoshi Suzuki; Shigeyuki Akiba; Hideaki Tanaka, all of Tokyo; Katsuyuki Utaka, Musashino, all of Japan

[73] Assignee: Kokusai Denshin Denwa Kabushiki Kaisha, Tokyo, Japan

[21] Appl. No.: 387,511

[22] Filed: Jul. 28, 1989

[30] Foreign Application Priority Data

Aug. 5, 1988 [JP] Japan ................................. 63-195840

[51] Int. Cl.$^5$ ............................................... G02F 1/29
[52] U.S. Cl. ............................... 350/96.13; 350/96.14
[58] Field of Search ................ 350/96.12, 96.13, 96.14

[56] References Cited

U.S. PATENT DOCUMENTS 4,772,854  9/1988  Silberberg .................... 350/96.13 X

FOREIGN PATENT DOCUMENTS 0107019  6/1985  Japan ................................. 350/96.13

*Primary Examiner*—John D. Lee
*Attorney, Agent, or Firm*—Emmanuel J. Lobato; Robert E. Burns

[57] ABSTRACT

An optical modulation element is disclosed which has, on a substrate directly or through a lower clad layer, an optical waveguide layer of a low impurity concentration, an upper clad layer of a refractive index smaller than that of the optical waveguide layer, and electrodes, and in which light of a constant intensity incident on a light incident end face of the optical waveguide layer is intensity-modulated by changing the absorption coefficient of the optical waveguide layer by means of an electric field applied thereto across the electrodes so that the thus modulated light is emitted from a light emitting end face of the optical waveguide layer. In accordance with the present invention, a plurality of low impurity concentration regions and a plurality of high impurity concentration regions are disposed alternately with each other in contact with at least one of the lower and upper clad layers in the direction of travel of light in such a manner that the distribution density of the plurality of high impurity concentration regions increases in the direction of travel of light.

3 Claims, 2 Drawing Sheets

OPTICAL MODULATION ELEMENT

BACKGROUND OF THE INVENTION

The present invention relates to an optical modulation element which modulates light incident thereon from the external.

The fiber optic communication technology has developed through utilization of the ultra-low loss property of optical fibers and the ultra-wide band property intrinsic to light, and the fiber optic communication is now under study for longer-distance, large-capacity transmission in many countries. Now that the transmission loss of the optical fiber has reached a theoretical limit, studies for higher-speed, larger-capacity transmission are particularly important.

At present, high-speed ON-OFF control of an optical signal is generally effected by a method of directly modulating a semiconductor laser. With the direct modulation system, however, since a current of the semiconductor laser serving as an oscillation element is caused to vary at high speed, its oscillation wavelength changes significantly with time, resulting in the spectral width of oscillation becoming abnormally wider than the spectral width of the modulation band. In consequence, in a long-distance or high-speed transmission optical pulses to be received are distorted largely through the influence of wavelength dispersion by the optical fiber, and hence no excellent transmission characteristic can be obtained. To avoid this, there has recently been studied a method of modulating the semiconductor laser at high speed by an external optical modulation element while holding the laser output constant.

As the optical modulation element, there have been proposed an optical modulation element using a ferrodielectric substance such as $LiNbO_3$ and an optical modulation element which can be integrated monolithically with a DFB laser or similar single-wavelength semiconductor laser. Among these optical modulation elements, the latter electroabsorption type optical modulation element in which an electric field is applied to a modulating waveguide layer to perform an intensity modulation of the output light by an electroabsorption effect is regarded as the most promising element.

However, the conventional electroabsorption type optical modulation element is capable of low-voltage modulation, high-speed operation and narrow-band oscillation when the intensity of incident light is low, but it is defective in that these characteristics significantly deteriorate when the light intensity is raised to a practical value of several mW.

SUMMARY OF THE INVENTION

It is an object of the present invention, in order to solve the above-mentioned defect of prior art, to provide an optical modulation element which is capable of low-voltage, high-speed modulation in case of increasing the intensity of incident light.

To attain the above object of the present invention, an optical modulation element of the present invention has its feature in that a clad layer overlaying or underlaying an optical waveguide layer is formed by a plurality of low impurity concentration regions and a plurality of high impurity concentration regions in such a manner that the high impurity concentration regions are progressively longer in the direction of travel of light to increase the electric field intensity in the waveguide accordingly, thereby limiting variations in the number of carriers to be absorbed per unit length.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, an example of prior art will first be described.

Figure 1:
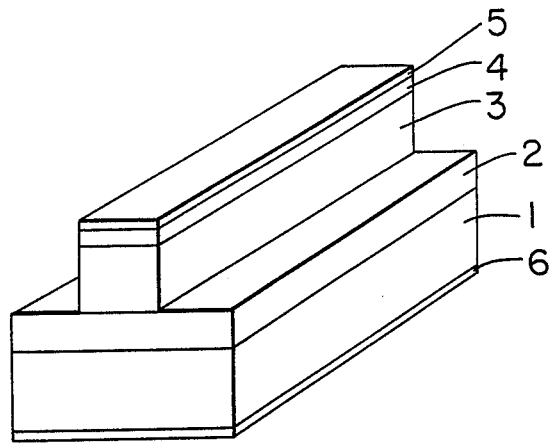
FIG. 1 is a schematic diagram of a conventional electroabsorption type optical modulation element.

FIG. 1 is a perspective view of a conventional electroabsorption type optical modulation element. On an n-type InP substrate 1 there are laminated an $n^-$-InGaAsP modulating waveguide layer 2, a mesa-shaped p-type InP clad layer 3, and a p-type InGaAsP contact layer 4, and a p-side electrode 5 and an n-side electrode 6 are deposited over the p-type InGaAsP contact layer 4 and the n-type InP substrate 1, respectively. With this optical modulation element, a minus voltage applied to the p-side electrode 5 and a plus voltage applied to the n-side electrode 6, respectively, are varied by applying light to the InGaAsP modulating waveguide layer 2 so that its absorption coefficient is varied, thereby making it possible to modulate the intensity of the emitted light. It is essential to the electroabsorption type optical modulation element that it is capable of low-voltage modulation, high-speed modulation and suppression of an increase in the spectral width during the high-speed modulation. It has been considered, up to now, that the optical modulation element of this type permits the high-speed modulation and the suppression of an increase in the spectral width because the closer to the photon energy $h\nu$ of incident light the forbidden band energy Eg of the InGaAsP modulating waveguide layer 2 is, the more greatly its absorption coefficient can be varied by the lower voltage and the more the device length L (i.e., the length of the InGaAsP modulating waveguide layer 2 from the light receiving end face to the light emitting end face thereof) can be reduced. Accordingly, attention has been paid only to a difference between the both energies, $\Delta Eg$ ($Eg - h\nu$), in the past, and it has been considered that an optical modulation element of high performance could be implemented by setting the energy difference $\Delta Eg$ to 30 to 40 meV. It has been found, however, that although the conventional optical modulation element exhibits excellent characteristics in the modulating voltage, the modulation bandwidth and the spectral width of oscillation when the intensity of incident light is about 100 $\mu W$ or lower, the modulating voltage markedly increases and the modulation bandwidth also decreases as the intensity of incident light exceeds 0.1 mW.

Close studies of phenomena such as an increase in the modulating voltage and a decrease in the modulation bandwidth caused by an increase in the intensity of incident light have revealed that these characteristic deteriorations largely depend on the energy difference, ($\Delta Eg = Eg - h\nu$), between the energy gap Eg of the optical waveguide layer and the photon energy $h\nu$ of incident light and occur when the energy difference ΔEg is 50 meV or below. As regards the device length dependence, it has been made sure that when the energy difference ΔEg is 30 to 40 meV, changes in the device length in the range of 0.3 to 2.5 mm have substantially no effect on the characteristics and allow their deteriorations.

The above experimental results indicate that when the intensity of incident light is high, a space charge effect by excess carriers, which occurs only in a very small region near the light receiving end where the light intensity is very high, lowers the field intensity and decreases the modulation speed.

The principle of the present invention will hereinafter be described.

Letting the intensity of light incident on an optical modulator and the absorption coefficient and the optical confinement coefficient of the optical waveguide layer be represented by $I_{(0)}$, $\alpha$ and $\Gamma$, respectively, the light intensity $I_{(x)}$ at a distance x from the light receiving end face can be expressed as follows:

$$I_{(x)} = I_0 e^{-\alpha \Gamma x} \quad (1)$$

and the amount of light absorbed per unit length is as follows:

$$\frac{\alpha I_{(x)}}{\alpha x} = -\alpha \Gamma I_{(x)} \quad (2)$$

Eq. (2) is proportional to the number of carriers absorbed per unit length. In the conventional modulation element, since $\alpha$ and $\Gamma$ are constant, the number of carriers absorbed per unit length is substantially in proportion to $I_{(x)}$, and the number of carriers absorbed in the vicinity of the light receiving end is abnormally larger than the number of carriers absorbed in the vicinity of the light emitting end. In a case where the intensity of incident light is low, the absorbed carrier distribution, even if nonuniform, have no influence on the band structure, and hence does not pose any problem, but when the intensity of incident light increases excess carriers absorbed near the light receiving end cancels the applied electric field, affecting the modulating voltage and the modulation speed.

In view of the above, the present inventors considered that if $\alpha \Gamma I_{(x)}$ in Eq. (2) would be held almost constant so that carriers of substantially the same number are absorbed over the entire length of the optical waveguide layer from the light incident end to the light emitting end thereof, effective optical modulation could be achieved without generating excess carriers which would be nonuniformly distributed locally. That is to say, by making the absorption coefficient $\alpha$ to be small at a place where the amount of light is large and to be large at a place where the amount of light is small, a high performance optical modulation element can be implemented which is free from a decrease in the modulation bandwidth and an increase in the modulating voltage when high intensity light is incident on the element.

With reference to the accompanying drawings, embodiments of the present invention will hereinafter be described in detail.

(EMBODIMENT 1)

Figure 2:
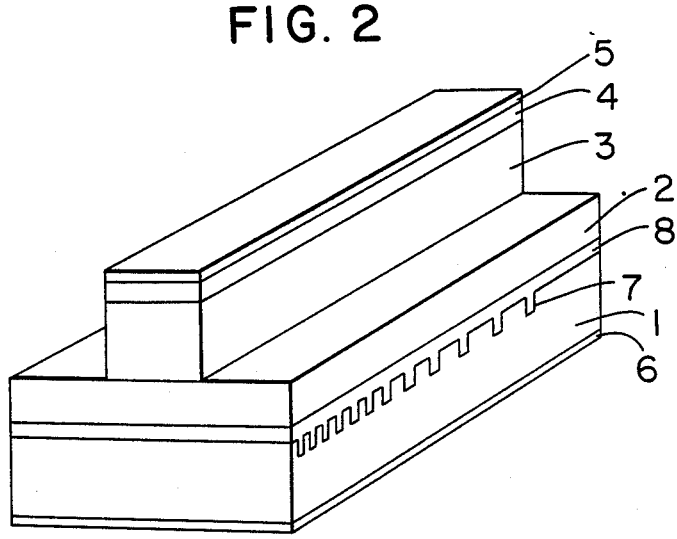
FIGS. 2 and 3 are schematic diagrams illustrating optical modulation element structures of first and second embodiments of the present invention.

FIG. 2 illustrates schematically an optical modulation element according to a first embodiment of the present invention. There are formed irregularities in the surface of an $n^+$-InP substrate 1 which has an impurity concentration of $5 \times 10^{18}$ cm$^{-3}$ or so and on which are laminated an $n^-$InP layer (a lower clad layer) 8 having an impurity concentration of approximately $1 \times 10^{15}$ cm$^{-3}$, an $n^-$-InGaAsP (emitted light wavelength: about 1.45 μm) optical waveguide layer 2 about 0.25 μm, a $p^+$-InP clad layer (an upper clad layer) 3, and a $p^+$-InGaAsP contact layer 4. Further, a p-side electrode 5 and an n-side electrode 6 are deposited over the p-type InGaAsP contact layer 4 and the n-type InP substrate 1, respectively. Incidentally, the thicknesses of those portions of the $n^-$-InP layer 8 overlying the convexties of the irregularities 7 are around 0.08 μm and the element length is of 360 μm.

The concavities in the surface of the n-type InP substrate 1 have length of about 3 μm (in width in the direction of travel of light) and depths of 0.3 μm. The lengths of the convexities are 2.35 μm (twice), 7.7 μm (twice), 9 μm (twice), and 20 μm (once) at intervals of approximately 20 μm, and the subsequent convexities have lengths of 220 μm.

In other words, the irregularities 7 need only to be formed so that their intervals become longer stepwise toward the light emitting end face from the light incident end face.

With this structure, the effective width of a depletion layer decreases in the direction of travel of light, and consequently, the electric field increases accordingly. The mean electric field intensity in the optical waveguide layer 2 under application of a voltage of two volts changes from 40 KV to 60 KV toward the light emitting end from the light incident end, and the absorption coefficient $\alpha$ for incident light of a 1.55 μm increases from 50 cm$^{-1}$ to 160 cm$^{-1}$ in the direction of travel of light. Moreover, since the light intensity decreases by 10% each at 20 μm intervals and the absorption coefficient increases by 10% each, the number of carriers absorbed per unit length remains unchanged over a region from the position of 100% light intensity to the position of 30% light intensity. After dropping to 30% the light intensity is reduced down in 1/100 by the 220 μm length convexity. A 3 dB bandwidth is 10 GHz or more.

According to this embodiment, the numbers of carriers absorbed are equal at almost all points from the light incident end to the point where the light intensity is reduced to 30%; namely, the number of carriers absorbed at every point is made equal. Accordingly, there is no possibility that carriers are excessively absorbed locally near the light incident end where the light intensity is high as in the prior art example, and hence no space charge effect will be produced. This permits the implementation of a high performance optical modulation element which is free from deterioration of its charcteristics even when high intensity light is applied.

While in the above the lengths of the $n^+$-InP convexities different in impurity concentration from the $n^-$-InP concavities are changed at intervals of 20 μm, they may also be varied continuously. Further, in Embodiment 1 the numbers of carriers absorbed at all points from the light incident end to the position where the light intensity decreases to 30% are made equal to one another, but it is also possible to adopt a structure in which the same number of carriers are absorbed in all regions.

(EMBODIMENT 2)

Figure 3:
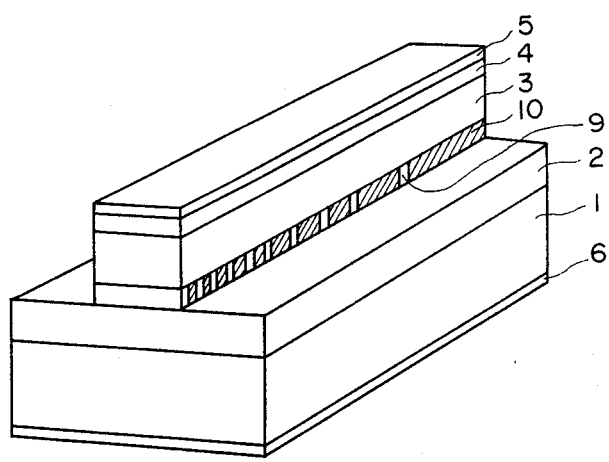

FIG. 3 schematically illustrates a second embodiment of the optical modulation element of the present invention.

This embodiment differs from the prior art example in that $n^-$-InGaAsP (emitted light wavelength: 1.2 μm) layers 9, which has a thickness of 0.3 μm and a length of 3 μm, and $p^+$-InGaAsP layers 10, which has a thickness of 0.3 μm but different in length, are alternately disposed between the $p^+$-InP upper clad layer 3 and the optical waveguide layer 2 in the direction of travel of light so as to vary the absorption coefficient in that direction.

The $p^+$-InGaAsP layers 10 are formed longer toward the light emitting end as is the case with the $n^+$-InP convexities in Embodiment 1.

In the above the lengths (the widths in the direction of travel of light) of the $n^-$-InGaAsP layers 9 are made constant and the lengths of the $p^+$-InGaAsP layers 10 are changed, but it is also possible to employ a structure in which the lengths of the $n^-$-InGaAsP layers 9 decrease toward the light emitting end from the light incident end.

Also in this embodiment, the number of carriers absorbed is constant at all places of light intensity lowering from 100% to 30% as in Embodiment 1 and it is likely that the space charge effect is produced by locally excessive absorption of carriers at the light incident end as in the prior art example. Accordingly, it is possible to implement a high performance optical modulation element which is free from deterioration of its charcteristics even when the intensity of light incident thereon is high.

Incidentally, three applications (Pat. Appln. Nos. 42198/88 to 42200/88) have been filed in the name of the applicant of this case on optical modulation elements intended to serve the same purpose as that of the present invention, but the present invention offers a structure easier to fabricate than those of the optical modulation elements proposed in these prior application.

The conductivity type of the optical waveqide layer may also be the $p^-$-type. Although the present invention has been described in connection with the case of employing materials of the InGaAsP/InP series, the invention is applicable as well to materials of the AlGaAs/GaAs, AlGaAs/InP series, etc. Furthermore, it is also possible to use multiple quantum well layers of such materials, in which case the energy gap mentioned in the above is an effective energy gap dependent on the quantum level. While in the above the stripe structure for transverse mode stabilization has been described to be the stripe loaded type, prior art structures such as buried stripe structure, a ridge waveguide stripe structure, etc. can all be employed.

As described above, in accordance with the present invention, the optical modulation element is constructed so that the absorption coefficient is small near the light incident end where the light intensity is high but large near the light emitting end so as to make constant the number of carriers absorbed per unit length. Accordingly, even if the light intensity is increased, there is no possiblity of local generation of excess carriers which leads to an increase in the modulating voltage and a decrease in the modulation bandwidth by the space charge effect. Thus, the present invention offers a high performance optical modulation element which permits low-voltage, high-speed optical modulation.

The method of forming the irregularities in the surface of the $n^+$-InP substrate and depositing thereon the $n^-$-InP layer, the $n^-$-InGaAsP layer, etc. is advantageous in that these layers can be grown by one step. This allows ease in the manufacture of the optical modulation element which retains high-performance characteristics when high intensity light is incident thereon.

The structure, in which InGaAsP layers of different conductivity types are formed unevenly on the $n^-$-InGaAsP wavequide layer 2, also provides a high performance optical modulation element, because the irregularities can be formed by thermal diffusion and is excellent in crystallinity.

The optical modulation element of the present invention uses the same optical waveguide mechanism as that of the prior art example but controls only the electrical property (conductivity) of the waveguide mechanism to gradually increase the absorption coefficient in the direction of travel of light, so that no optical loss such as mode transformation will be incurred and no characteristics will be degraded even when the intensity of incident light is high.

The optical modulation element of the present invention is applicable to ultra-high-speed, long-distance fiber optic communication in the Giga-bit band, and hence is of great utility.

What we claim is:

1. An optical modulation element which has, on a substrate, directly on or through a lower clad layer, an optical waveguide layer of a low impurity concentration, an upper clad layer of a refractive index smaller than that of the optical waveguide layer, and electrodes for applying an electric field between the substrate and the upper clad layer, and in which light of a constant intensity incident on a light incident end face of the optical waveguide layer is intensity-modulated by changing the absorption coefficient of the optical waveguide layer by means of an electric field applied thereto across the electrodes so that the thus modulated light is emitted from a light emitting end face of the optical waveguide layer, characterized in that a plurality of low impurity concentration regions and a plurality of high impurity concentration regions are disposed alternately with each other in contact with at least one of the lower and upper clad layers in the direction of travel of light in such a manner that the distribution density of the plurality of high impurity concentration regions increases in the direction of travel of light.

2. An optical modulation element according to claim 1, characterized in that the lower clad layer is composed of a high impurity concentration substrate having irregularities comprising concavities and convexities and a low impurity concentration clad layer buried in the concavities of the irregularities and in that the lengths of the convexities of the irregularities increase toward the light emitting end face from the light incident end face of the optical waveguide layer.

3. An optical modulation element according to claim 1, characterized in that the upper clad layer is composed of a plurality of low impurity concentration clad layer regions of a first conductivity type and a plurality of high impurity concentration clad layer regions of a second conductivity type which are disposed alternately with each other, and in that the lengths of the high impurity concentration clad layer regions increase toward the light emitting end face from the light incident end face of the optical waveguide layer.

* * * * *